March 6, 1962     S. S. FLASCHEN ET AL     3,024,119
GLASS COMPOSITION AND COATED ARTICLE
Filed June 3, 1959                          5 Sheets-Sheet 1

INVENTORS S. S. FLASCHEN
A. D. PEARSON
BY
George S. Indig
ATTORNEY

March 6, 1962     S. S. FLASCHEN ET AL     3,024,119
GLASS COMPOSITION AND COATED ARTICLE
Filed June 3, 1959     5 Sheets-Sheet 2

INVENTORS S. S. FLASCHEN
A. D. PEARSON
BY
*George S. Indig*
ATTORNEY

March 6, 1962 S. S. FLASCHEN ET AL 3,024,119
GLASS COMPOSITION AND COATED ARTICLE
Filed June 3, 1959 5 Sheets-Sheet 3

INVENTORS S. S. FLASCHEN
A. D. PEARSON
BY
ATTORNEY

INVENTORS: S. S. FLASCHEN
A. D. PEARSON
BY
*George S. Indig*
ATTORNEY

INVENTORS S. S. FLASCHEN
A. D. PEARSON
BY
ATTORNEY

United States Patent Office 3,024,119
Patented Mar. 6, 1962

3,024,119
GLASS COMPOSITION AND COATED ARTICLE
Steward S. Flaschen, New Providence, and Arthur D. Pearson, Springfield, N.J., assignors to Bell Telephone Laboratories, Incorporated, New York, N.Y., a corporation of New York
Filed June 3, 1959, Ser. No. 817,747
5 Claims. (Cl. 106—47)

This invention relates to a new class of glass compositions. These compositions have distinctive physical and chemical properties suggesting many uses. Important among such uses is the encapsulation of electrical circuit elements and assemblies as well as subassemblies including such elements.

In copending United States application Serial No. 798,912, filed March 20, 1959, and now Patent Number 2,961,350, there are disclosed certain novel glasseous systems, exemplary of which is the arsenic-sulfur-thallium system. Such glasses represent a departure from most conventional glasses in having exceedingly low "melting points"; exemplary glasses of this system have 30-poise viscosity points at temperatures of the order of 125° C. This property suggests their use as encapsulating media in the dip coating of semiconductor transducing devices which are electrically or physically impaired at the melting temperatures of conventional glasses. Glasses disclosed in this copending application are uniquely adaptable to the encapsulation of circuit elements by reason of their ability to improve the electrical characteristics of such elements. Accordingly, it has been found that due to a mechanism generally ascribed to gettering, semiconductor devices encapsulated in such materials have shown orders of magnitude improvement in leakage current under reverse bias, either immediately after dipping or upon thermal or power aging.

Disclosure of the glasseous materials of this copending application has provoked significant interest among workers in the art. More extensive tests of these glass compositions have shown no inconsistent results. Continued power and thermal aging testing for the devices reported in the copending application has shown further improvement and a continuation of the trend set forth.

Although the materials of this copending application appear to be virtually a complete solution to most encapsulating problems recognized by the art, a minor deficiency has been revealed. The glasses show no undesirable characteristics in the operating temperature range of most devices. However, it has become apparent that a temperature coefficient of expansion mismatch of the glass and most metallic or semiconductive materials may result in a degree of cracking due to thermal mismatch at extremely low temperatures. Accordingly, in devices so encapsulated, when put on a thermal cycling test having a low specification temperature of −40° C., fine cracks are likely to appear in most such compositions before completion of about forty cycles. It is, of course, unnecessary to state that the glasses do not lose their utility due to this condition. Due to the excellence of electrical characteristics and the generally improved yield made possible, the glasses may be justified economically even where an outer metallic or plastic encapsulating medium is added to act as a final container. From an economic standpoint it is feasible to specify the use of such encapsulated devices only where the ambient temperature does not attain such low values.

Recognizing the desirability of a glasseous composition having the characteristics of the arsenic-sulfur-thallium material and not prone to defects resulting from thermal shock at very low temperature, research has continued in the hopes of finding an additive which would overcome this difficulty. This program has resulted in the compositions of the instant invention.

In accordance with this invention it has been found that the halogens, iodine and bromine, have the same general effect on the arsenic-sulfur glass system previously thought uniquely characteristic of thallium. Accordingly, it has been found that the elements arsenic and sulfur with iodine or bromine, form single-phase glasses within certain critical composition ranges. It has been found that these compositions are mutually soluble with the glasseous compositions of our copending patent application cited above. A wide range of intentionally added solute materials has been found to have an effect on the physical and chemical properties of the iodine system of this invention. Without modification, glasses of this new system evidence 30-poise viscosities in the range of from about 50° C. to about 400° C. The softening point range of the iodine and bromine glasses is striking, those of the iodine system ranging from about −17° C. up to the order of 200° C. Softening points in the bromine system may be even lower.

As indicated, the properties of the glassy materials herein are modifiable by the inclusion of certain additional ingredients. It has been found, for example, that the addition of a small amount of lead has the effect of increasing the plastic flow point while increasing the softening point to a considerably lesser extent. The addition or partial substitution of antimony for arsenic has a similar effect. A partial substitution of selenium for sulfur increases the wetting power of these materials for ceramic and glassy surfaces of other systems. Effects observed upon the inclusion of other materials are set forth in more detail below.

As discussed above, the thallium system glasses of our copending application have a marked effect on the electrical characteristics of devices contacted. These results have been ascribed to a gettering mechanism and considerably more substantiating evidence has been adduced. In any event, it is clear that the thallium glasses, in one manner or another, immobilize ionic impurities on the surface of electrical devices, which, otherwise, have a tendency to drift under the influence of an applied or internal field so as to cause an accompanying drift in electrical characteristics. Such characteristic drift is, of course, undesirable, and in the instance of semiconductor devices has been found to be a significant cause of device failure.

It has been found that the instant compositions have a similar effect on electrical circuit elements, the surfaces of which are contacted by these materials. In fact, as is clearly indicated by the accompanying data, electrical properties of encapsulated devices are improved even more markedly by the instant compositions generally at an earlier processing stage. Accordingly, as is seen from the attached tables, leakage current of reverse biased semiconductor transducers may be decreased an order of magnitude or greater simply by dipping in a liquid composition herein. The increased degree of gettering so indicated is believed associated with the greater fluidity of the systems herein as compared with those set forth in our copending application. In general, it appears that the gettering efficiency is so great that, under proper encapsulating conditions, devices are improved to such an extent that the observed electrical characteristics are better than any thus far observed for devices of a given type. Data have, in fact, been adduced which may indicate that the electrical properties of certain of these devices are for the first time limited by body rather than surface breakdown.

Although the first encapsulating procedure generally results in a degree of excellence seldom seen, there are instances in which further improvement results upon power aging or by what is now found to be its full equivalent, upon thermal aging. Accordingly, in experiments here conducted it has been found that often the very small number of devices not following the general trend of improvement of other devices of the same batch may be brought to the same electrical level by a short time thermal aging procedure.

For convenience, much of this specification is in terms of encapsulation by a dip procedure. Dipping is, of course, a convenient laboratory method for producing rapid results without the necessity for complex processing apparatus. Commercially, however, it is expected that encapsulating procedures may make use of preforms or of vapor deposition. Pre-form encapsulation, discussed herein in connection with FIGS. 7A and 7B, may make use of a simple tubular section of a composition herein which is initially fitted about one or more leads to a device and which is subsequently caused to flow, thereby encapsulating all or a portion of the device with increased temperature. Vapor deposition suggests itself for use, not only in the coating of individual elements, but also in laying down protective layers on assemblies and subassemblies including such elements. Examples of such assemblies and subassemblies of course include printed circuits and printed wiring boards. In this connection it has been found that the glasseous compositions of this invention may be vapor deposited on either hot or cold substrates. Layers so deposited have been examined, and have been found to constitute a stable glass region in common with glass materials of the instant compositions deposited by other methods.

For convenience, this description is primarily in terms of semiconductor transducing devices. In particular, many of the tests reported herein were conducted on diffused junction silicon devices having thermal compression bonded leads. Experimental work was most expeditiously carried out on this class of devices since the sensitivity of their electrical properties to surface contaminants is legend. It is well-known, however, that other electrical circuit elements oftentimes manifest a drift in electrical properties for the same reason. Accordingly, it is observed that the resistance value of resistors of all types difts with age. This drift is reliably ascribed to a drift in ionic impurities, more pronounced under the influence of the electrical field produced in use. Similar characteristics are seen in other devices such as capacitors, inductors and the like.

Accordingly, it is seen that electrical circuit elements of all types are desirably encapsulated or otherwise contacted by materials of the instant invention. Even where improvement or stabilization of such elements by ionic immobilization is not required, the excellent moisture barrier provided may be sufficient justification. Discussion largely in terms of semiconductor transducing elements should, therefore, be considered to be exemplary only.

The term "encapsulation" is here used in a somewhat general sense. Although it is frequently contemplated that the glasseous layer produced by any of the instant compositions may serve as the final barrier between the surface of the device and the ambient atmosphere, there are uses and circumstances in which another or additional outer barrier is desirably included. This may be desirable from a mechanical standpoint to improve mechanical rigidity and/or handling, or to incorporate the instant compositions in devices being encapsulated by other means, as, for example, by the use of metallic cans.

In addition to the use of these compositions as a final packaging ingredient, their use as an expendable cleaning material in pretreatment of devices is indicated. In this use, contacting the device to be encapsulated in a molten and, most desirably, a highly fluid amorphous composition of this invention may replace the consider-ably more costly and complex vacuum bakeout now generally utilized prior to conventional can encapsulation.

It is clear to those skilled in the electrical circuit elements arts that the term "encapsulation" even in its narrower sense need not indicate total encapsulation, that is to say, the nature of many devices indicates a comparatively limited area sensitive to surface effects. Such sensitive areas may correspond with the area defined by a small number of minority carrier diffusion lengths of an active junction or with the contact region between a device and an electrical lead. Accordingly, it may be necessary or desirable to coat only one surface, or even a limited portion of a surface, of a given device or other article. Such limited coating may be produced by vapor deposition through a mask by any of many known procedures or by other means known to those skilled in the art. The glass media herein have been found to wet all metals tested. Although, in common with other glass compositions, their temperature coefficients of expansion are typically higher than those for metals and semiconductive materials, resulting thermal mismatch is offset by characteristics associated with the low softening points of the glasses so that all tested glass compositions have withstood thermal cycling between the limits of —40° C. and 110° C. without evidence of cracking. In a single cycle of the test used, the coated device was started at room temperature, the temperature was then lowered to —40° C., was then raised to 110° C. and was then decreased to room temperature. The rate of temperature change was constant over the cycle, the total time being two hours per cycle. This cycle was repeated at least 30 times in accordance with a manufacturing test specification found acceptable for commercial devices intended for general use.

Reference is had to the accompanying drawings in which.

Figure 8:
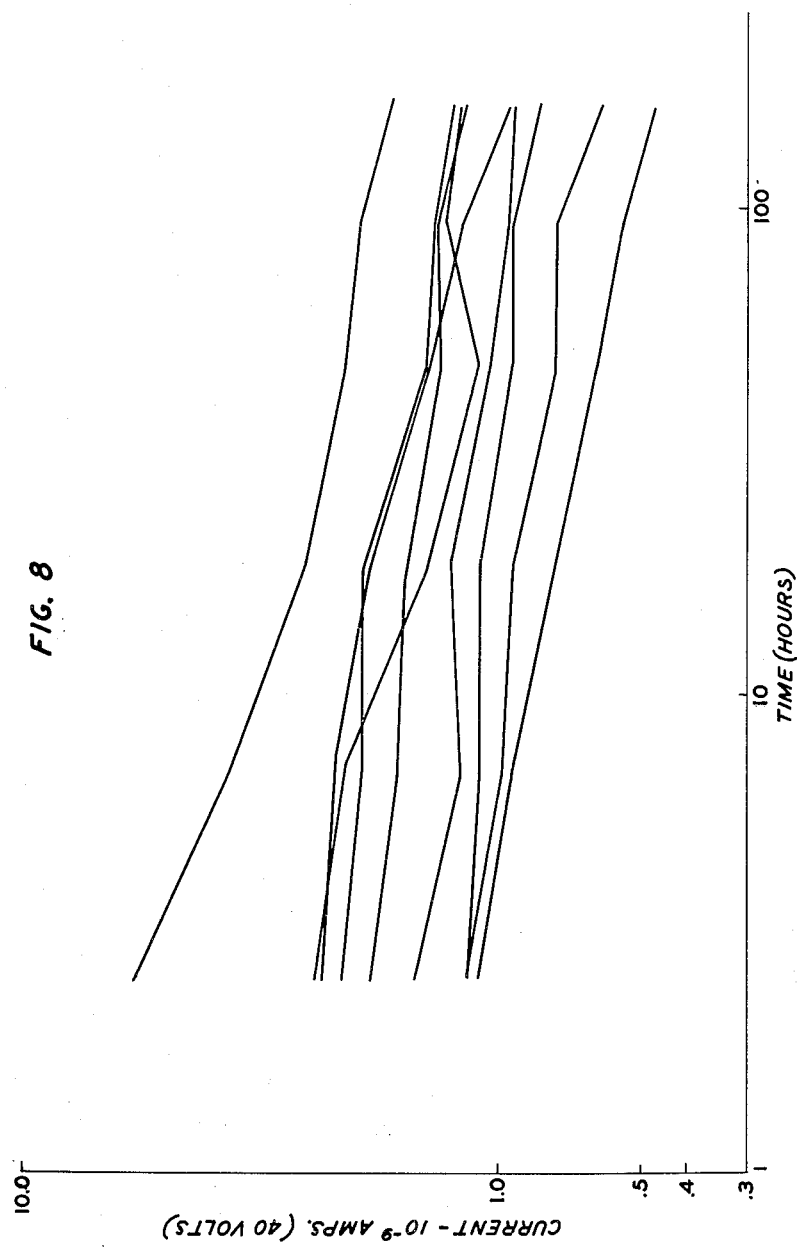

FIG. 8 on coordinates of leakage current and time is a plot showing the improvement in operating characteristics of nine devices encapsulated in a glass composition herein upon forward bias power aging.

Referring again to FIG. 1 there is shown a ternary composition diagram for the arsenic-sulfur-iodine system. The area enclosed within the straight lines joining points 1, 2, 3 and 4 defines the exclusive range of compositions of this system resulting in a single-phase glassy material. The area enclosed by the straight lines joining points 5, 2, 3 and 6 defines the same range, however bounded by a minimum iodine content of 5 weight percent. Inclusion of as little as 1 weight percent of iodine in any arsenic-sulfur composition lying between the approximate compositions corresponding with points 1 and 4 has a distinct effect in decreasing both the 30-poise viscosity points and the softening point. A much more significant difference in properties is, however, obtained by inclusion of 5 or more weight percent of iodine, and it is expected that commercial procedures will make use of at least this minimum content. For these reasons it is considered that a preferred compositional range of glasseous materials in the arsenic-sulfur-iodine system is defined by the area bounded by the straight lines joining the points 5, 2, 3 and 6. For certain purposes still more preferred range is defined by the points 7, 8, 9 and 10. This area is formed as follows: The iodine origin is joined both with the 40 percent sulfur-60 percent arsenic and the 70 percent sulfur-30 percent arsenic binary composition points. A line is then passed through point 7, corresponding with a 20 percent iodine addition to the stoichiometric compound, and point 10, corresponding with a 10 percent iodine addition to the 70 percent sulfur-30 percent arsenic composition. The other end of this preferred area is defined by a line passing through points 8 and 9, corresponding with the high iodine-content end of the glass forming region.

The area within the two lines joining the iodine origin to the arsenic-sulfur binary boundary defines a range of compositions which, from a theoretical standpoint, manifest no devitrification due to crystallization of elemental sulfur on the one hand or arsenic sulfide on the other (although tests to date have shown no instability in any one of the compositions included within the area defined by the lines joining points 1, 2, 3 and 4.) Points 7 and 10 on these compositional lines correspond with the approximate minimum content of iodine required to produce a decrease in 30-poise viscosity point of the order of 30 percent on the centigrade scale, in both instances to a value approximately corresponding with an accepted maximum temperature tolerable by a general class of semiconductor devices. Encircled points 11 correspond with glasseous compositions of this invention used to empirically determine the indicated boundary of the glassy region of the system. Several of these compositions were actually utilized in the encapsulation of semiconductor devices. Data for the improvement in electrical properties resulting from their use is reported herein. 30-poise viscosity points and softening points for many of the compositions corresponding with points 11 are reported on FIGS. 2 and 3. Encircled points 12 correspond with compositions which have been vapor deposited as discussed below.

Figure 1:
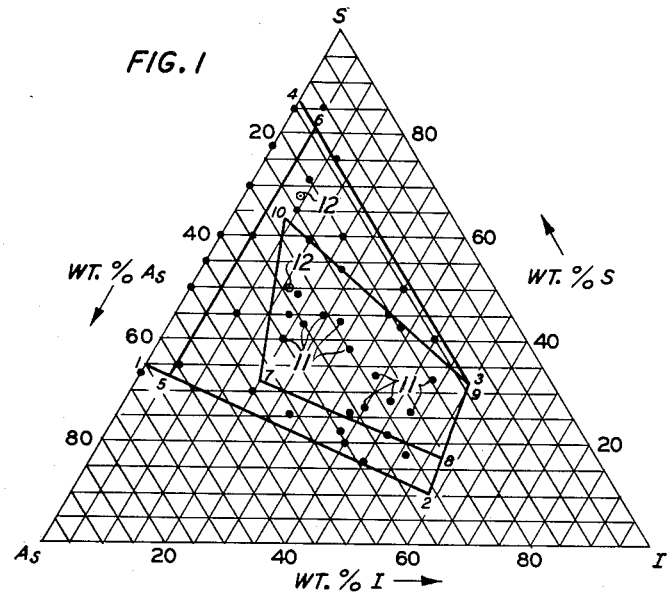
FIG. 1 is a ternary composition diagram showing the glasseous range of compositions of the arsenic-sulfur-iodine system.

Preferred ranges are indicated on the diagram of FIG. 1 and are discussed in the preceding paragraph. The basis for the preferred compositional ranges is set forth. It should be understood that these ranges are preferred only for certain uses. So, for example, in each instance minimum iodine content was determined chiefly on the basis of the reduction in 30-poise viscosity temperature. Low viscosity in the molten state is of chief interest in the dip encapsulation of delicate devices where any undue strain may result in a broken lead or contact. It is clear that for certain other uses the indicated ranges are not preferred. So, for example, in vapor depositions where the article to be coated or otherwise contacted need not be brought up to the melt temperature and where viscosity is of little concern, circumstances may indicate the preferred use of a composition within the larger area 5, 2, 3, 6 but not within the region encompassed by the lines joining points 7, 8, 9 and 10. Similarly, in preforms (FIGS. 7A, 7B) tolerable viscosities are of a somewhat higher order and other properties may dictate choice of preferred compositions. In general, preferred compositions within either of the preferred regions are selected on the basis of the characteristics of interest for a particular use.

Limiting compositions in weight percent corresponding with the numbered points are as follows:

TABLE I

| Point | Arsenic | Sulfur | Iodine |
|---|---|---|---|
| 1 | 65 | 34 | 0 |
| 2 | 31 | 11 | 58 |
| 3 | 13 | 32 | 55 |
| 4 | 13 | 87 | 0 |
| 5 | 62.5 | 32.5 | 5 |
| 6 | 13 | 82 | 5 |
| 7 | 47.5 | 32.5 | 20 |
| 8 | 26 | 17 | 57 |
| 9 | 13 | 32 | 55 |
| 10 | 28 | 63.5 | 8.5 |

Figure 2:
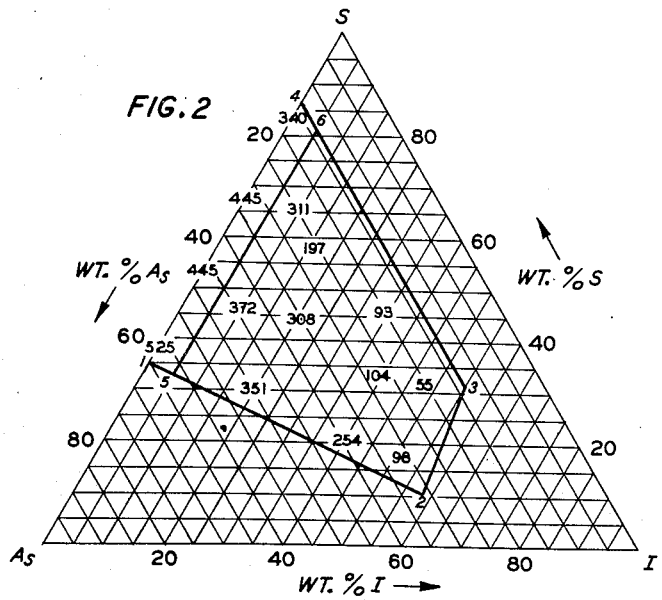
FIG. 2 is a 30-poise viscosity thermograph of the glass system of FIG. 1.

FIG. 2 is a ternary diagram for the arsenic-sulfur-iodine system on the same coordinates as the diagram of FIG. 1, showing the temperature at which certain of the noted compositions have an approximate viscosity of 30 poises. The temperatures are expressed in degrees centigrade. The precise composition points are at the centers of each of the middle digits of the noted temperatures. The information contained on this figure is of particular interest in the dip-encapsulation of delicate devices. In general, viscosities substantially in excess of 30 poises are unsuitable in the dip-coating of semi-conductor devices due to their delicate nature. Viscosities of somewhat higher orders are suitable in encapsulating media to be used on larger or more rigid devices or assemblies.

Figure 3:
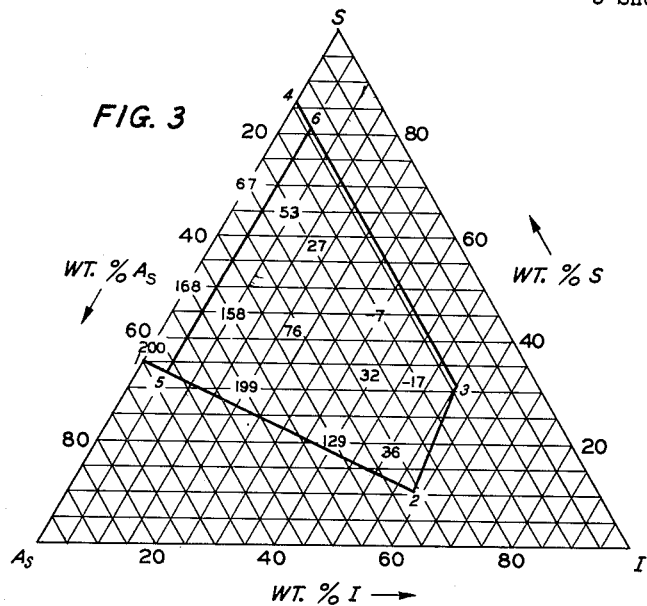
FIG. 3 is a ternary composition diagram of the system of FIG. 1 showing softening temperatures of selected compositions in the defined glass forming region.

FIG. 3 is a ternary diagram for the arsenic-sulfur-iodine system on the coordinates of the diagrams of FIGS. 1 and 2 containing temperature notations corresponding with softening temperatures of the designated compositions. The precise compositions are those corresponding with a point made at the center of each designated temperature value. Softening point data of the type here presented are of chief interest in the design of encapsulated devices intended for exposure to extremely low temperatures. It is seen from the data reported in this figure that the softening points of the included compositions range from a low value of the order of $-17°$ C. to an upper value of the order of $200°$ C.

As discussed above, the softening point data presented in FIG. 3 is of significance relative to the gettering action of the glass compositions herein. It has been observed that the gettering activity of the iodine compositions of this invention is significantly improved by comparison with the thallium compositions of our copending application above cited. This improvement is ascribed to improved kinetics of the gettering process. This trend was, of course, seen in the thallium system itself where greater gettering power was observed in those included compositions having lower softening points.

Although the defined glassy region of FIG. 1 is described as "exclusive," it should be understood that the precise boundaries depicted are approximate by nature and intimately dependent upon processing conditions. The glassy region may be extended slightly by rapid cooling, so as to minimize recrystallization. By analogy to other glassy compositions, it is expected that materials substantially outside the ranges indicated may be stabilized in the glassy state by the addition of one or more stabilizing ingredients.

For simplicity, the compositional data is presented in the form of the pure system arsenic-sulfur-iodine. As a person skilled in the art would expect, it has been found that small additions and substitutions may be made in the indicated glasseous materials without affecting the glassy state. Such inclusions may be intentional or unintentional. Intentional inclusions include ingredients added to alter the physical or chemical properties. For example, it has been found that various materials are suitably added to increase the plastic flow temperature. Such additions do not necessarily have an equal effect on softening points. Accordingly, it has been found that addition of less than 2 weight percent lead to a 30–70 weight percent arsenic-sulfur binary material to which 10 percent iodine has been added (24–67–9 weight percent arsenic-sulfur-iodine) resulted in an increase in the 30-poise viscosity temperature from 311° C. to 374° C., while increasing the softening point of only about 2° to 55° C. Addition of 5 weight percent antimony to the same base composition increases the 30-poise point to over 370° C. and the softening point to 87° C. The low limit on antimony addition producing an appreciable effect is 1 percent or less; lead substantially lower, about 0.1 percent. Addition of 5 percent of bismuth or tellurium increases wetting power for ceramic, the former addition resulting in appreciable wetting also for silicate glass. Bismuth acts much the same as antimony in increasing 30-poise points out of proportion to softening point for the range indicated. Fundamental studies have indicated that selenium and/or tellurium substitution for sulfur and antimony and/or bismuth substitution for arsenic may be made up to at least 20 mol percent of the substituted element without affecting the glassy state.

Several of the compositions reported on FIG. 1 have been made up utilizing bromine in lieu of iodine. In general it has been found that the bromine glass forming region is approximately coextensive with that indicated for the iodine system. Such glasseous materials are typicaly somewhat less viscous than the corresponding iodine systems. Several bromine glasses are liquid at room temperature. Certain of these have viscosities over a temperature range of up to about 350° C. approaching that of water at room temperature. Such materials are indicated as liquid fillers and for cleaning operations prior to encapsulation by other means, e.g., as a possible substitute for vacuum bakeout prior to the can-encapsulation of semiconductor devices. Viscosity and softening point values intermediate those characteristic of the iodine and bromine glasses are, of course, available by use of a combination of the two materials.

The glasseous materials of this invention and the thallium and related systems of our copending application, to which reference is made above, are mutually soluble. Such combinations offer yet another method for tailoring the physical properties of the resulting compositions.

As in the glass systems reported in our earlier application, certain substitutions may be made in the initial ingredients. The substitution of bromine for iodine has been discussed. The substitution of chlorine and fluorine of course suggests itself, although total substitutions are probably undesirable by reason of handling problems of the more reactive and gaseous materials. The partial or total substitution of antimony or bismuth for arsenic generally results in decreased fluidity. The partial substitution of selenium for sulfur is useful in increasing the wetting power of the glasseous compositions for ceramics and for other glass compositions, as, for example, the silicates and borosilicates. By the same token the partial substitution of tellurium for sulfur effectively increases the dielectric constant for a given arsenic-iodine inclusion.

The maximum tolerable unintentional ingredient content is dependent upon the intended use of the compositions. In the encapsulation or other packaging of semiconductor devices, it is conventional to adhere to an extremely high degree of cleanliness. In the coating of less sensitive devices, for example, transformers, inductors, capacitors and the like, so high a degree of cleanliness is not indicated in the manufacture of the devices. In most uses, the glasses of this invention are considered to be of value for their gettering properties.

As discussed above, it has been observed that comparatively large amounts, of the order of 20 weight percent or greater, of a large variety of non-ionic materials may be added to the glasses without affecting their glassy properties (although such additions certainly have the generally intended effect of varying the physical properties). Such materials include gallium, indium, thallium, antimony and bismuth.

It has been shown that a relatively high level of ionic impurity may be tolerated in the compositions herein even where these materials are to directly contact the surfaces of an extremely sensitive class of electrical circuit elements. Nevertheless, it is expected that in commercial production use will be made of the standard of cleanliness generally applicable to the devices to be encapsulated or otherwise treated. Since gettering potential, by its very nature, is affected by the total amount of impurities present, use of high purity materials may conceivably result in still greater improvement in final devices.

To aid in the teaching of the invention, a general outline describing one suitable method of preparing a glass composition of this invention is presented below. The method outlined is illustrative only. Alternate procedures are suggested and still others are known to those skilled in the art. The outlined method is directed to the preparation of a ternary composition in accordance with the diagram of FIG. 1; that is, to a composition of the arsenic-sulfur-iodine system. The same procedure may be followed for a glass of the arsenic-sulfur-bromine system and for glasses containing partially substituted antimony or bismuth for arsenic and tellurium or selenium for sulfur as reported herein. As is also discussed below, the glasses of this invention are not limited to the inclusion of two or three elements but may contain more than one element in any given position, as, for example, both sulfur and selenium or arsenic and antimony.

For ease of storage of starting material and general convenience in preparation and handling, binary compositions of, for example, arsenic and sulfur, and arsenic and iodine may be first prepared. An alternate method is to make the final mix from the three elemental materials.

Outline of Preparation

The starting materials are iodine, powdered sulfur and metallic arsenic.

The iodine is weighed and the amounts of sulfur and arsenic required to form the desired composition are calculated.

The indicated amount of sulfur is weighed out and is placed within a loosely corked test tube which is, in turn, held over a Bunsen burner. The sulfur is heated until it is melted to a thick gummy consistency. The test tube or other receptacle may be left open if a protective inert atmosphere is used.

The arsenic in the form of small metallic fragments and the iodine in the form of crystals are weighed and added to the molten sulfur.

The tube and contents are heated until an exothermic reaction occurs during which the contents of the tube reach a temperature of approximately 500° C. to 600° C.

The contents of the tube are mixed by swirling until all metallic arsenic goes into solution.

The tube is heated until the contents are entirely fluid.

In practice, it has been found that a 50-gram mixture is fused to homogeneity in about twenty minutes.

The fused mixture may be quenched in liquid nitrogen to prevent adhesion to the receptacle.

The above outline defines a method of manufacture of the glasses of this invention suitable for use on a laboratory scale. Laboratory alternatives as well as modifications necessary to put the process in commercial use are not described and are not considered necessary to the teaching of this invention. Actual reaction and fusion times are for the most part determinable by visual inspection. Actual operating temperatures are similarly of little significance, varying in accordance with the actual composition of the mix and fixed by the nature of the reaction. So, for example, the temperature at which the glass composition is formed is determined by the energies involved in the exothermic reaction and by the temperature gradients which may be tolerated by the apparatus under the ambient conditions in use.

Figure 4A:
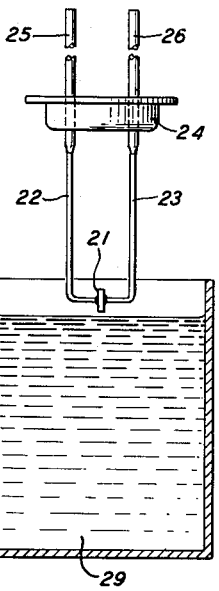
FIGS. 4A, 4B and 4C are diagrammatic front elevational views of a typical semiconductor transducing device undergoing an encapsulation process of this invention utilizing one of the compositions herein.
Figure 4B:
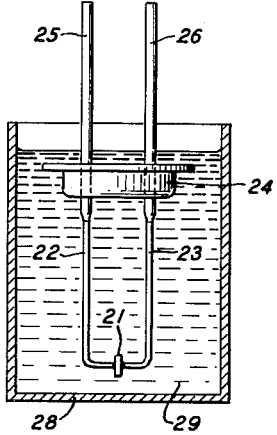
Figure 4C:
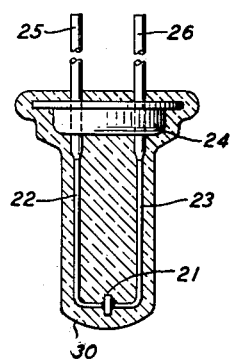

In FIGS. 4A, 4B and 4C the device depicted is a silicon $n^+p$ diffused junction diode having a rated breakdown of 56 volts. This type of device contains operative $n^+p$ element 21, thermal compression bonded gold lead wires 22 and 23 bonded to gold plated Kovar electrodes 25 and 26 which in turn pass through gold plated Kovar header 24. Electrodes 25 and 26 are electrically insulated from header 24 by means of a thermally matched borosilicate glass seal. The manufacturing details concerning the header and matched glassy material are well-known to those skilled in the art. The particular element 21 depicted has extremely close spacings, of the order of one mil between leads wires 22 and 23 and the operative junction. Devices of this general configuration are extremely sensitive to deterioration of electrical properties due to surface contamination.

In FIG. 4A the depicted device is shown poised above container 28, which may be made of chemical porcelain or other glass, metallic or ceramic material, said container containing molten glasseous material 29, which is one of the compositions of this invention. Glasseous material 29 is maintained molten by heat source not shown.

In FIG. 4B junction device 21, together with the assembly described above, is shown immersed in material 29 within container 28.

Immersion times have been found to be a critical factor in the degree of improvement resulting upon encapsulation. The data reported on FIG. 8 was taken from devices which were immersed for a period of the order of 30 seconds. The data reported in Table II was taken from devices immersed for periods of the order of one and one-half minutes. It is seen that the improvement obtained by encapsulation is appreciably greater for the devices which were immersed for the longer period. As discussed in connection with FIG. 8 and Table II, however, it is seen that power aging or thermal aging may bring the device to the same operating level. Where long immersion times are used (Table II), thermal aging has not resulted in further significant improvement in the device.

After immersion, device 21, together with its assembly, is withdrawn and the glasseous material adhering thereto is permitted to solidify.

FIG. 4C shows such a device after solidification. Glasseous material 30 of the composition of material 29 of FIGS. 4A and 4B has solidified.

Figure 5A:
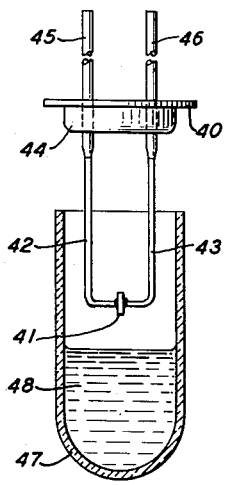
FIGS. 5A, 5B and 5C are diagrammatic front elevational views of the same type of transducing device undergoing encapsulation by an alternate process of this invention.
Figure 5B:
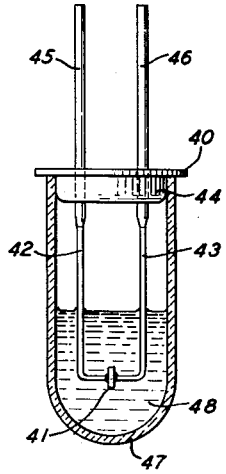
Figure 5C:
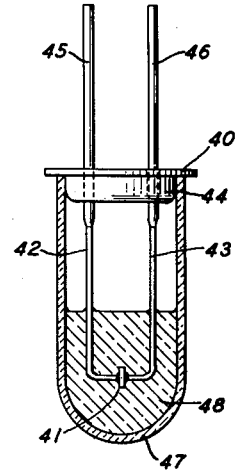

FIGS. 5A, 5B and 5C illustrate an alternative dip encapsulation procedure whereby the receptacle becomes the final assembly. In accordance with these figures there is shown device 40, of the same general configuration as that shown in FIGS. 4A through 4C and containing element 41, wire leads 42 and 43 spot welded to electrodes 45 and 46, which in turn pass through header assembly 44. Electrodes 45 and 46 are insulated from the metallic header 44 by a glasseous material such as a borosilicate glass in the manner described in conjunction with FIGS. 4A through 4C. Receptacle 47, which may be of glass, metal, or ceramic, heated by means not shown, contains a molten glass 48 of a composition in accordance with this invention.

FIG. 5A shows device 40 prior to immersion. FIG. 5B shows device 40 immersed in molten glass 48. Glass 48 is maintained molten for a period at least sufficient to produce enclosure of all immersed surfaces. It is seen that capsule 47 is of such size as to form a close-fitting joint with header 44. It is not generally necessary to hermetically seal this joint since the glass forms a complete barrier to moisture or other ambient.

In accordance with FIG. 5C, material 48 has been solidified so as to result in the encapsulation of device 40 within glassy medium 48. Sheathing 47 originally served as the receptacle for the molten material.

FIGS. 4A through 4C and 5A through 5C depict species of the encapsulating procedures using the glasses here described. Other procedures include various other means for applying the molten media to the devices, as, for example, by brushing, spraying, etc., and also vapor deposition. As noted herein, it is not necessary to encapsulate the entire device. For example, where pre-forms are to be used, it is convenient to form it in such manner that it closely fits over one or more leads attached to the most vulnerable portion of the device, subsequent heating producing sufficient flow to cover either the entire device or only this vulnerable area. Similarly, although the described diode devices are exemplary of that category of devices most sensitive to atmospheric effects and therefore beneficially encapsulated in accordance with these procedures, other devices are substantially improved by similar treatment. So, for example, resistors, capacitors, rectifiers, both elemental and oxide, inductors, transformers, and other circuit elements, as well as entire assemblies and subassemblies including such elements, are beneficially encapsulated both by the procedures of FIGS. 4 and 5 and by others described herein.

Where devices are to be dip coated in the manner described, it is convenient to maintain a mass of the molten glass at its dipping temperature, generally considered to correspond with a viscosity of the order of about 30 poises, as by a hot plate. Since, however, gettering activity has been found to be temperature dependent within a given glass composition, where it is desired to obtain maximum improvement during encapsulation, it is preferable to maintain the glasseous material at a temperature approaching the maximum tolerable temperature for the particular device. Accordingly, in the encapsulation of the $n^+p$ silicon diodes described, it was found desirable to encapsulate at temperatures of the order of 300 to 350° C. To protect the glass and possibly also the device or other article from oxidation at such elevated temperature, it may be desirable to maintain the molten material in an inert atmosphere although no deleterious effect on the glasses have been observed in air. Suitable atmospheres include nitrogen, helium and argon. In such dip encapsulation it is necessary only to keep the article immersed in the molten glass for a period sufficient to result in encasement of all surfaces of concern, leaving only the extremities of the leads uncoated, although as described herein longer periods may be desired to immobilize ionic impurities. All that remains is to withdraw the article from the mix and permit the coating to solidity.

In accordance with conventional techniques, where the glass composition used has a softening point appreciably above room temperature, the glass-encased article may be annealed to minimize strain by gradually reducing temperature from the softening temperature down to room temperature over a period of hours. This annealing procedure may be part of the initial cooling program after encapsulation or may be carried out as a separate procedure afterwards.

Where encapsulation is to be carried out by dipping and where the devices to be encapsulated are delicate, it is desirable to maintain the molten mix at a temperature such that its viscosity is not substantially in excess of 30 poises. The 30-poise range of these glasses is of the order of 55° C. to 450° C. The dip temperatures which may be tolerated vary in accordance with the characteristics of the device which is to be encapsulated. No attempt is here made to define such critical temperatures for the vast range of devices which are advantageously encapsulated in accordance with this invention. In general, the maximum dip temperature which may be tolerated by a semiconductor translating device, such as a germanium or silicon, or group III-group V diode, triode, or tetrode, is determined by the lowest melting composition of any solder or alloying material which may be present. In general, in contrast to commercial glasses, even the highest temperature within the 30-poise range of the glasses herein is insufficient to produce any significant change in junction or gradient configuration or properties due either to alloying or diffusion. 30-poise temperatures of exemplary glass compositions of this invention are set forth in FIG. 2.

Where it is desirable to protect the glass from fracture, this may be done in any desired manner, using any suitable material without regard to possible contamination of the device. The glass seal is completely hermetic and does not permit the penetration of water vapor or any other contaminant which may come in contact with its outer surface. Plastic coating materials, such as polyvinyl chloride, polyethylene and the like, are suitable. Such outer plastic encapsulation has been found to significantly decrease the likelihood of cracking upon exposure to severely low temperatures. As noted above, however, the glasses of this invention, even where used as final encapsulating media under extreme mismatch conditions, withstood standard cycling tests down to −40° C. without additional protection. The procedure outlined in conjunction with FIGS. 5A and 5C may be advantageous where additional mechanical protection is desired since the final device in accordance with such procedure includes both a glass shield and an outer protective sheathing of metal or other suitable material.

Where the encapsulating procedure is designed to produce a completely encased glass seal, it is necessary that a hermetic bond be formed between the coating and any electrical leads. It has been found that adequate wetting and a resultant hermetic bond is formed by use of any of the glass compositions herein, in conjunction with the metals: aluminum, silver, gold, platinum, tantalum, molybdenum, nickel, tungsten, brass and Kovar (an alloy of the approximate composition expressed in weight percent 53.7% iron, 29% nickel, 17% cobalt, 0.3% manganese). Bonds with all of these lead materials have been made, tested and found to be firmly adherent. The excellent wetting power of the glasseous compositions herein for aluminum and aluminum-containing alloys is desirable since this metal has a temperature coefficient of expansion more closely matched to these glasseous compositions than are those of the other common metals finding general use as lead or other structural materials in device manufacture. Such lead material, may therefore, be preferred where the device is to be exposed to extremely low temperatures.

Figure 6:
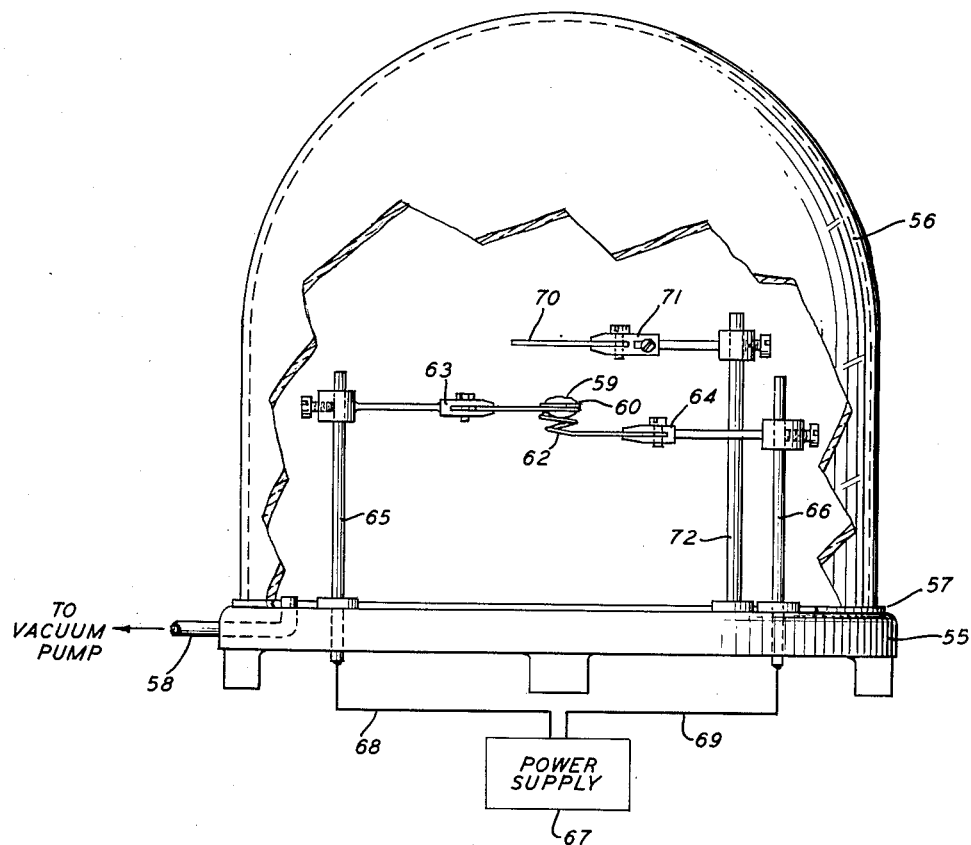
FIG. 6 is a diagrammatic front elevational view of one type of apparatus found suitable for use in the vapor deposition of the instant glass compositions.

The laboratory vapor deposition apparatus of FIG. 6 has been successfully used in vapor deposition encapsulation with glasses of the compositions set forth. The apparatus consists of platform 55 and closely fitting bell jar 56 hermetically sealed to platform 55 by neoprene O-ring 57. The atmosphere within bell jar 56 and platform 55 is evacuated by withdrawing atmospheric gas through the tube 58 connected to vacuum pumping means not shown. The glass composition to be vapor deposited, 59, in powdered or other convenient form, is held in receptacle 60, which is, in turn, supported within the uppermost turn of conicular resistance winding 62 held by clamps 63 and 64, in turn attached to electrode-supports 65 and 66. Electrode-supports 65 and 66 are electrically connected with power supply 67 by means of wire leads 68 and 69. The article to be vapor coated, 70, typically a printed wiring board, is held by clamp 71, which is attached to support 72. Means for rotating support 72 or other means not shown may be provided for moving article 70 with respect to glass source 59.

The entire glass-forming range of FIG. 1, as well as the combined and substituted systems above described, may be vapor deposited. Exemplary compositions which have been vapor deposited are those designated as points 12 on FIG. 1.

Compositions as defined herein may be vapor deposited either from a glassy source or from a powdered or other convenient mix onto a heated or a cold substrate. It is considered an important advantage of these compositions that, unlike common commercial glasses, a relatively thick (1.5 mil or greater) coating may dependably be produced upon a heated or unheated substrate.

Although a homogeneous single-phase glass results upon vapor deposition of any of the compositions herein as source materials, it should be noted that deviations between source and deposited compositions may, in certain instances, result. In this connection it has been observed that the vapor pressure of stoichiometric arsenic sulfide is somewhat greater than that of any iodine compounds contained in the arsenic-sulfur-iodine system. Where, therefore, a source is vaporized to exhaustion, the initial composition deposited is of a composition enriched with respect to $As_2S_3$, the final deposited portion being enriched with respect to iodine. Although this is not considered to be of concern in most encapsulating procedures, the main effect of a variation in iodine content being observed in a change in 30-poise and softening point temperature, the deposited composition may be homogenized by heating the substrate either during deposition or subsequently. Where a large or continuous source is used, the desired composition of deposit may be produced by regulating the source composition accordingly. As noted above, bismuth, tellurium and selenium-containing glasses result in somewhat greater wetting. In particular, it has been observed that extremely adherent bonds are formed between selenium-containing glasses and a broad range of organic and inorganic materials including carbon, ceramic materials including those which are silica- and alumina-containing, other glassy materials such as the borosilicates and polymeric materials including as the halogenated hydrocarbons such as the perfluorocarbons.

Vapor deposition procedures, as well as the effect of variation of spacing and other parameters in such procedures, are well known to those skilled in the art. It is not considered necessary to treat such procedures at length in this description. In general, it has been found that, operating with a source 59 of approximate diameter 1 centimeter, a coating of uniform thickness is produced on an objective 70 approximating 3 centimeters in its longest dimension at a distance of 15 centimeters. Increasing the distance between source and objective does not impair uniformity of the deposited layer but increases the time necessary to obtain any given thickness. Decreasing this distance may result in a layer of non-uniform thickness which may or may not be undesirable.

Figure 7A:
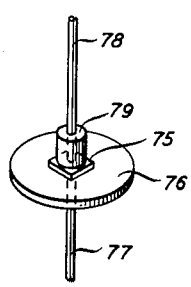
FIG. 7A is a perspective view of a semiconductor device and a pre-form of one of the compositions herein prior to heating.

FIG. 7A depicts a semiconductor device 75 attached to heat sink 76. Electrical connection is made via electrodes 77 and 78. It is considered that the sensitive portion of device 75 is its upper surface, to which electrode connection 78 is made or is otherwise in a portion of device 75 above heat sink 76. Glass pre-form 79, which may be a pressed powder body of any one of the glass compositions here described in the form of a short length of tube, is placed over lead 78 in contact with the upper surface of device 75.

The temperature of pre-form 79 is then raised to its flow temperature and there maintained for a period sufficient to produce flow about device 75 and to produce a bond between the glass and heat sink 76. Flow temperatures for the glasses herein are intermediate their 30-poise temperatures and their softening point temperatures. As an example, a 24–67–9 weight percent arsenic-sulfur-iodine glass composition having a softening point of about 53° C. and a 30-poise point of about 311° C. has been found to be sufficiently fluid over a temperature range of from about 125° C. to about 200° C. to produce sufficient flow over the depicted device in a period of 10 or 15 minutes.

Figure 7B:
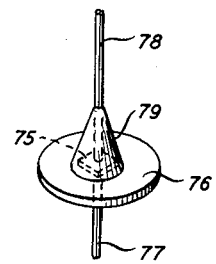
FIG. 7B is a perspective view of the device of FIG. 7A after heating.

In FIG. 7B it is seen that pre-form 79 has been distorted by heating so as to result in encapsulation of device 75 and in a hermetic bond with the upper surface of heat sink 76.

Although from a laboratory standpoint dip encapsulation appears to be the most favorable, commercial procedures are expected to make use of pre-forms. By the use of such prefabricated details, the glass medium may be added to the device immediately subsequent to manufacture, and large numbers of devices including such details may then be encapsulated by maintenance at moderate temperatures for fairly short periods.

FIG. 8 contains curves plotted from power aging data taken from phosphorus-boron diffused silicon diode devices of the type described in conjunction with FIGS. 4A through 4C encapsulated in glass compositions of this invention. Procedures followed are common aging procedures generally utilized to screen devices. In commercially encapsulated devices, the aging procedure is expected to bring out any latent defects and to otherwise stabilize the operating characteristics, generally resulting in characteristics somewhat inferior to those of the device before encapsulation. In the instance of canned devices, aging is designed to show up any serious leaks and to point up any drift in characteristics due to ionic or other sources. Such power aging tests are generally carried out under a variety of conditions. Diode devices, for example, may be biased forward or reverse at a variety of voltages. It is generally recognized that the most severe power aging is carried out under conditions that produce the most severe heating of the device. Accordingly, deterioration of characteristics and stabilization of commercial devices is most rapid under conditions of forward bias where the much larger current flow and resultant joule heating result in a substantially greater temperature increase.

At various predetermined intervals during power aging, the aging bias is removed, the device is reverse biased, and the leakage current is measured. The ordinate units on FIG. 8, expressed in millimicroamperes, are a measure of such leakage current. It is conventional to measure such leakage currents under a reverse bias which is a substantial fraction of the breakdown voltage of the device under test. The devices from which the data of FIG. 8 were taken were low voltage diodes having a breakdown voltage of about 56 volts. Leakage currents were measured under a reverse bias of 40 volts.

The devices of FIG. 8 were dip encapsulated in a glass of weight composition 24% arsenic, 67% sulfur, 9% iodine. It is seen from the curves that the leakage current showed a regular decreasing trend for all devices tested, the average decrease for the 100-hour test being of the order of five times. During test these devices were forward biased sufficiently to produce a constant 200 milliampere current flow.

As discussed previously the devices for which data are reported on FIG. 8 were kept immersed in the molten glass for a period of about thirty seconds during encapsulation. Although it is not indicated on the figure, the major improvement in leakage current resulted during the dipping operation itself. The devices for which data are reported had a leakage current under the designated test conditions (40 volt reverse bias) of the order of 20 millimicroamperes or greater. Improvement realized upon dipping was an order of magnitude or better. As is seen from the curves, even this degree of improvement did not result in the attainment of optimum electrical characteristics for these devices. It is important to note that there is no substantial convergence of the characteristics plotted and no significant leveling off of the curves. It must, therefore, be assumed that further aging and/or actual use will result in still further ionic gettering and in improvement in operating characteristics. It may be noted that the electrical characteristics of the devices were all considered acceptable in accordance with applicable specifications, both before and after dipping. Accordingly, the improvement reported may not be ascribed to the recovery of "reject" units. In this connection, measured data have shown the recovery of such reject units. In the data reported herein (Table II) it is seen that at least one device having a reverse bias leakage current in excess of 100 millimicroamperes was improved to well within the acceptable limit by dipping and thermal aging. Subsequent thermal aging for 17 hours at a temperature of 150° C. resulted in a further improvement of about 2 more orders of magnitude, so bringing the device to within the range of characteristics evidenced by other devices of the same batch.

From an economic standpoint it may be concluded that the economy realized by the use of any of the compositions herein, either as a final encapsulant or as an intermediate cleansing material or filler, is not limited by the total cost of encapsulation. The indicated increase in yield may result in a cost saving several times greater than the entire expense of encapsulating. To show the improvement in electrical characteristics that may result during encapsulation and to show the equivalence of various glass compositions in this respect, an additional batch of devices of the type tested in accordance with the description corresponding with FIG. 8 were tested. These devices were first cleaned in accordance with an accepted schedule found to be suitable in the can encapsulation of such devices, and leakage current under reverse bias voltage or 40 volts was measured. The devices were next dipped in a molten solution of glasseous material maintained at a temperature of the order of 300–350° C., using the type of capsule described in conjunction with FIGS. 5A through 5C, after which the same electrical measurement was made. The dipping conditions differed from those utilized on the devices for which data are recorded in FIG. 8 chiefly in immersion time in the molten glass. For these runs immersion was extended to about a minute and a half. Results were generally uniform from composition to composition and represented an improvement of approximately two orders of magnitude. These data are reported in Table II below.

TABLE II

| Diode | Glass composition—Weight percent | | | $I_R$—Reverse current (m$\mu$a) at 40 volts | |
|---|---|---|---|---|---|
| | Arsenic | Sulfur | Iodine | Before encap. | After encap. |
| 1 | 24 | 67 | 9 | 28 | 0.9 |
| 2 | 24 | 67 | 9 | 20 | 0.5 |
| 3 | 24 | 67 | 9 | 20 | 0.7 |
| 4 | 24 | 67 | 9 | 24 | 9.0 |
| 5 | 24 | 67 | 9 | 22 | 0.5 |
| 6 | 40 | 20 | 40 | 20 | 0.8 |
| 7 | 40 | 20 | 40 | 20 | 0.7 |
| 8 | 50 | 30 | 20 | 18 | 2.1 |
| 9 | 28 | 33 | 39 | 21 | 0.35 |
| 10 | 28 | 33 | 39 | 22 | 0.3 |
| 11 | 27 | 27 | 46 | 20 | 0.3 |
| 12 | 60 | 35 | 5 | 21 | 1.1 |
| 13 | 60 | 35 | 5 | 22 | 0.4 |
| 14 | 35 | 60 | 5 | 26 | 0.34 |
| 15 | 35 | 60 | 5 | 28 | 12.0 |
| 16 | 25 | 65 | 10 | 22 | 1.1 |
| 17 | 25 | 65 | 10 | 30 | 0.6 |
| 18 | 33.4 | 50 | 16.6 | 80 | 0.32 |
| 19 | 33.4 | 50 | 16.6 | 110 | 12.0 |

All devices were thermal aged at a temperature of 150° C. for a period of 22 hours. Characteristic changes were inconsequential except for those devices having relatively high leakage current after dipping. Accordingly, diodes Nos. 4, 15 and 19 had leakage currents of 0.3, 0.45 and 0.3 millimicroampere after thermal aging. A small number of devices, which were tested under the same conditions reported on Table II, failed. All such failures showed up as open circuits on the test apparatus and are, therefore, ascribed to mechanical causes, probably to broken leads or contacts. It may be noted that the glass composition in which diodes Nos. 1 through 5 were encapsulated is the same as that used in the diodes reported on FIG. 8. These data are included for comparison purposes and indicate that the ultimate values obtained on power aging may be obtained upon dipping alone under the indicated conditions.

The maximum leakage current permissible in accordance with the manufacturing specification for the devices tested in Table II is 100 millimicroamperes under the test conditions. It is seen, therefore, that each of the devices dipped with the exception of No. 19 meets the commercial standard for this device both before and after dipping. In this connection it is interesting to note that the improvement in leakage current for this "reject" unit was of the same order of magnitude as the others, and that the leakage current level was reduced to its optimum value (as indicated by that value for the other units) after thermal aging.

It is seen from the data presented above that improvement in operating characteristics may result from thermal aging and power aging as well as during encapsulation. Encapsulation itself, has, in certain instances here reported, resulted in a substantial decrease in leakage current to the best values thus far seen for the type of device tested. Stability of the leakage current value of such devices upon thermal aging appears to indicate that these characteristics have been optimized at least under the prescribed test conditions and for the glass compositions used. It is seen that this effect is increased with increased exposure to the molten material and is, therefore, more pronounced in dip encapsulation than in vapor deposition encapsulation, particularly on an unheated substrate; although the same degree of improvement is realizable by maintaining the substrate in a heated condition for a period commensurate with that of immersion in dip encapsulation. It is also seen that significant improvement results upon thermal aging for comparatively short periods at temperatures of the order of 150° C. This effect is accelerated at higher temperatures, although such conditions may result in plastic flow where an unmodified arsenic-sulfur-iodine glass is used without an outer container. As indicated, this effect may be avoided by use of a modifying additive such as lead, antimony, bismuth, or any of the others listed above.

Although from Table II it is seen that all devices dipped showed appreciable improvement in electrical characteristics, those which were not brought down to a common level of the order of appreciably below 1 millimicroampere were further improved to this level upon thermal aging. Both levels are, of course, appreciably better than the usual specification requirement for such devices. The success of dip encapsulation and of thermal, as well as power, aging, is dependent upon the softening point of the encapsulating medium. It is to this characteristic of the instant glasseous compositions that the improvement over the glasses described in our copending application above cited is ascribed. Although lower softening point compositions show a greater improvement in operating characteristics for a given time and temperature aging, it is expected that all elements encapsulated in any one of the compositions herein described, including those containing added or substituted ingredients designed to increase plastic flow temperature, will ultimately attain a condition in which its characteristics are unaffected by ionic impurities. That such condition may have been attained is indicated by the plasma type of breakdown, generally associated with body-limited rather than surface-limited devices, observed for devices encapsulated in included compositions. This ultimate value is, of course, dependent upon the device itself rather than upon the nature of the glasseous encapsulating medium.

It should be emphasized that many of the glasseous compositions, including all of those in which diodes 6 through 19 (Table II) were encapsulated, were initially intended for thermal cycling test. These compositions were not prepared in accordance with the standards of cleanliness recommended in the manufacture of semiconductor devices. The data here reported establish the fact that a high degree of cleanliness is not required. The first glass composition reported on Table II, which was also used in the encapsulation of those devices for which data are reported in FIG. 8, was more carefully prepared. The ionic impurity level in this composition was of the order of .001 percent. The ionic impurity level for the other compositions was, by comparison, of the order of .005 percent. It is interesting to note that measured characteristics from composition to composition were fairly uniform.

Experimentation has established that power aging is effective as an accelerated aging tool only insofar as the temperature of the device is increased due to joule heating. It has been established, therefore, that thermal aging is the complete equivalent of power aging. Both types of aging are, therefore, considered to be accelerated tests indicating any drift in characteristics obtained in use and, to a lesser extent, by shelf aging.

The glass-encapsulating media of this invention have been discussed primarily from the standpoint of ionic gettering and resultant improvement in characteristics obtained on a sensitive class of devices beneficially encapsulated in such compositions. The characteristics of the glasses set forth are otherwise beneficial, both in the described uses and in others. The body resistivities of glasses of the arsenic-sulfur-iodine system range from $10^{12}$ to $10^{16}$ ohm-cm. Dielectric constants for glasses of the iodine and bromine systems are, respectively, of the approximate ranges 4 to 12 and 4 to 10. Dielectric loss in these materials, measured at 1 megacycle, are of the order of about .0005 and .0003, respectively.

Test data presented have been in terms of a parameter extremely sensitive to ionic contamination in a class of devices in which this parameter is critical. Ionic impurities are considered generally undesirable in all circuit elements and assemblies and subassemblies including such elements. In general, such contaminants result not only in an initial impairment of characteristics of concern but also in a gradual drift of such characteristics during use, the contaminants migrating under the influence of electrostatic fields, either inherent in the devices or introduced during circuit operation. The glasseous materials and encapsulating methods of this invention are considered unique in that they result in the gettering and consequent trapping of such contaminants, thereby preventing drift resulting in the impairment of characteristics sensitive to this source of contamination. Articles encapsulated in accordance with this invention show an improvement in such characteristics upon encapsulation (more pronounced where contamination is high) and also upon aging, either shelf or power, either accelerated or not. This improvement in characteristics produced upon aging is here reported for devices prepared in accordance with the highest degree of commercial cleanliness. Most of the elements for which data are here presented were acceptable prior to encapsulation and prior to aging. The small minority of elements still considered unacceptable from the commercial standpoint subsequent to encapsulation by these procedures is generally improved to well beyond recovery during a moderate period of thermal or power aging.

Due to their very nature as ion gettering materials, impurity limits of such materials in the glasseous compositions herein are not considered critical, some tests having been carried out with glasses prepared from CP grade ingredients. The ordinary cleanliness standards now in use in the semiconductor industry and as applied to other devices and assemblies in which the glasses are expected to be put to use are certainly adequate to result in glass encapsulations of the characteristics noted. Although it is expected that any glass composition herein, prepared by commercial standards for any of the indicated uses, will be well within any maximum limits on impurity content, it may be noted that it would be undesirable to use any such glass containing in excess of one tenth of 1 percent of total ionic impurities. Such impurities are notably the alkali metals such as sodium and potassium and also silver and copper.

It is believed clear that the improvement in characteristics here reported is due to the use of the encapsulating media per se and not to the particular encapsulating procedures used. The data have, for the most part, been reported for devices encapsulated by dipping, a procedure most conveniently employed in the laboratory. Suitability of these glasseous compositions for encapsulation by other procedures is set forth. Two such procedures particularly suitable from a commercial standpoint are vapor deposition and by the use of pre-forms. The former procedure is useful not only in the mass encapsulation of devices but also in the coating of sensitive areas of assemblies including electrical elements. An example of such an assembly is the printed circuit board. These glasseous compositions form adherent bonds with a broad class of materials now in use as substrate materials or as element materials. Variations in the encapsulating procedures here set forth, as well as minor variations in the glasseous compositions themselves, are apparent. It is considered that all such variations are within the scope of this invention.

The concept of using the glassy materials here described primarily as getters has also been discussed. Accordingly, their use may replace vacuum bakeout or other cleaning procedure in conjunction with canning or other packaging. In such use, although at least local wetting of the device is still required, complete hermetic sealing is not mandatory, such function being performed by an outer container. Such incomplete coatings have been found to produce the improvement in characteristics noted. Where clean-up or gettering is the prime object, the medium may take the form of a dry powder fill, the packaged device eventually being raised to a temperature sufficient to result in flow and wetting.

What is claimed is:

1. A single-phase glass comprising the materials of the ternary system arsenic-sulfur-iodine encompassed within the area on the ternary composition diagram of these three elements defined by the straight lines joining the following composition points expressed in weight percent:

| Arsenic | Sulfur | Iodine |
|---------|--------|--------|
| 62.5    | 32.5   | 5      |
| 31      | 11     | 58     |
| 13      | 32     | 55     |
| 13      | 82     | 5      |

2. The single-phase glass of claim 1 in which the said area is defined by the straight lines joining the following composition points expressed in weight percent:

| Arsenic | Sulfur | Iodine |
|---------|--------|--------|
| 47.5    | 32.5   | 20     |
| 26      | 17     | 57     |
| 13      | 32     | 55     |
| 28      | 63.5   | 8.5    |

3. An electric circuit element at least partially encompassed by a wetting layer of a single-phase glass comprising arsenic, sulfur, and at least one element selected from the group consisting of iodine and bromine, in which the said single-phase glass comprises a composition encompassed within the area defined by claim 1.

4. The circuit element of claim 3 in which the said single-phase glass comprises a composition encompassed within the area defined by claim 2.

5. A single-phase glass comprising the materials of the ternary system X—Y—Z encompassed within the area on the ternary composition diagram of these three elements defined by the straight lines joining the following composition points expressed in weight percent:

| X    | Y    | Z  |
|------|------|----|
| 62.5 | 32.5 | 5  |
| 31   | 11   | 58 |
| 13   | 32   | 55 |
| 13   | 82   | 5  | and in which X is arsenic containing from 0 to 20 mol. percent of at least one element selected from the group consisting of antimony and bismuth, in which Y is sulfur containing from 0 to 20 mol percent of at least one element selected from the group consisting of selenium and tellurium, and in which Z is at least one element selected from the group consisting of iodine and bromine.

References Cited in the file of this patent

UNITED STATES PATENTS

| 2,112,968 | Mavrogenis | Apr. 5, 1938 |
| 2,328,096 | Reevely | Aug. 31, 1943 |
| 2,883,292 | Jerger | Apr. 21, 1959 |
| 2,883,294 | Jerger | Apr. 21, 1959 |

FOREIGN PATENTS

| 889,913 | Germany | Sept. 14, 1953 |